United States Patent [19]

Kitano

[11] 3,801,975

[45] Apr. 2, 1974

[54] LAMP FAILURE DETECTING SYSTEM
[75] Inventor: Akira Kitano, Nagoya, Japan
[73] Assignee: Nippondenso Co., Ltd., Kariya-shi, Aichi-ken, Japan
[22] Filed: Jan. 26, 1972
[21] Appl. No.: 221,003

[30] Foreign Application Priority Data
Jan. 28, 1971 Japan.................................. 46-2917

[52] U.S. Cl. ................................ 340/251, 340/256
[51] Int. Cl. ............................................ G08b 21/00
[58] Field of Search ......... 340/251, 256; 315/82, 83

[56] References Cited
UNITED STATES PATENTS
3,633,196   1/1972   Winkler et al. ..................... 340/251

Primary Examiner—John W. Caldwell
Assistant Examiner—Daniel Myer
Attorney, Agent, or Firm—Cushman, Darby & Cushman

[57] ABSTRACT

A lamp failure detecting circuit for use with at least one lamp and an electric source, in which the lamp is actuated/de-actuated by driving means in response to a control signal produced by means including a changeover switch for changing the level of the control signal between first and second levels, the lamp being adapted to be actuated/deactuated when the control signal has the first/second level respectively; and the failure of the lamp is detected by a logic circuit when the control signal has the second level and, at the same time, when a detecting means detects not presence of the electrical potential of the electric source through the lamp, so that the occurrence of the failure is indicated by an indicating means.

10 Claims, 4 Drawing Figures

LAMP FAILURE DETECTING SYSTEM

BACKGROUND OF THE INVENTION

1. Field of the Invention

The present invention relates generally to lamp failure detecting systems and more particularly to a lamp failure detecting system for detecting occurrence of failure in various lamps installed on automotive vehicles.

2. Description of the Prior Art

In known systems of this type, it has been customary to detect occurrence of failure in lamps through analog techniques. Thus, there has been a drawback in that misoperations were caused by fluctuations in the power supply voltage, variations in the ambient temperature and so on and that the constants of component elements had to be determined very exactly thus unfavorably retarding more extensive utilization of integrated circuits.

SUMMARY OF THE INVENTION

It is an object of the present invention to provide a lamp failure detecting system which is designed, in order to solve the aforesaid deficiencies of the prior art systems, to detect occurrence of failure in lamps through a digital technique, so that not only no misoperation may be caused by fluctuations in the power supply voltage, variations in the ambient temperature and so on, but also the system can readily employ integrated circuits thereby making it smaller and more compact and hence extremely useful for installation in automotive vehicles which are restricted in the available mounting space.

According to the present invention, the operation required for failure detection is entirely carried out digitally, that is, the operation of its circuitry is carried out according to signals which are either "1" or "0" so as to detect occurrence of failure in lamps to be checked. Thus, there is an excellent effect in that occurrence of failure can be very accurately detected without being influenced by fluctuations in the power supply voltage, variations in the ambient temperature and so on. Moreover, the use of digital circuitry in the system of the present invention results in another excellent effect in that as compared with the conventional systems employing analog linear circuitry, more extensive use of integrated circuits can be achieved with a relatively large degree of freedom in selecting the constants of component elements and moreover the use of integrated circuits can make the system of the present invention smaller and more compact thus making it extremely useful especially when installed, for example, in automotive vehicles which are restricted in mounting space.

DESCRIPTION OF THE PREFERRED EMBODIMENTS

The present invention will now be explained with reference to the embodiment shown in the accompanying drawing.

Figure 1:
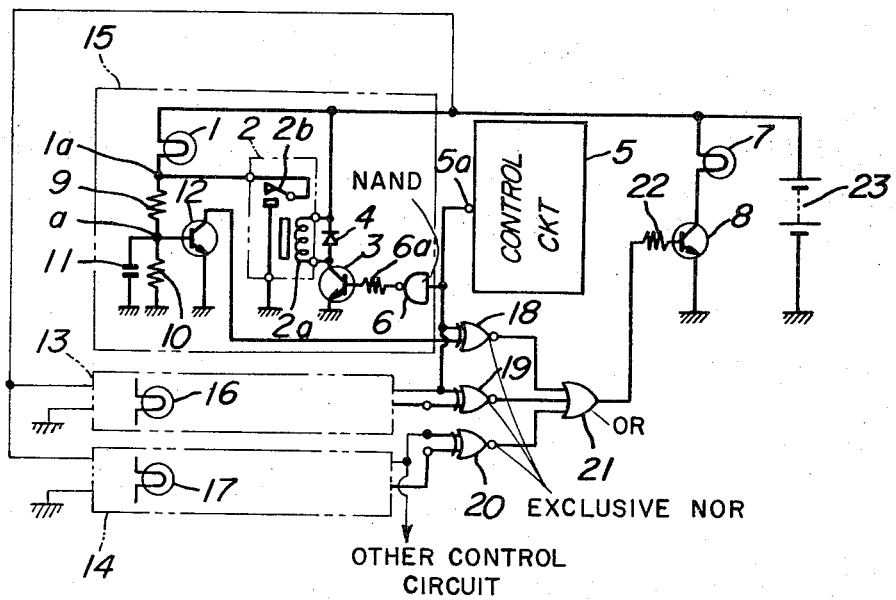
FIG. 1 is an electrical wiring diagram showing an embodiment of the lamp failure detecting system according to the present invention.
Figure 3:
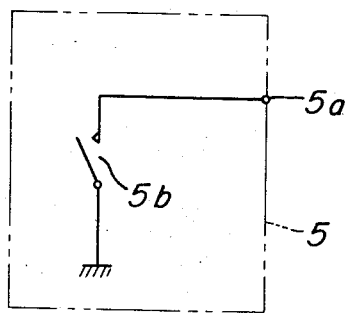
FIGS. 3 and 4 are electrical wiring diagrams showing the internal construction of the control circuit in the system of the present invention.

Referring to FIG. 1, numeral 1 designates a lamp whose failure is adapted to be detected, for example an automotive vehicle headlamp on the right. Numeral 2 designates a relay for interrupting the supply of electrical current to the lamp 1; 2a a relay coil; 2b normally open contacts. Numeral 3 designates a transistor connected in series with the relay coil 2a for controlling the supply of current to the relay coil 2a; 4 a diode connected in parallel with the relay coil 2a for absorbing the counter electromotive force. Numeral 5 designates a control circuit for generating signals for instructing the lamp 1 to turn on and off; the control circuit comprising for example a switch 5b shown in FIG. 3, a circuit comprising a transistor and integrated circuit devices for generating pulse-like signals or a relay comprising a coil and contacts, with a predetermined relationship between its output signals and the turning on and off of the lamp 1 such that the lamp 1 is caused to turn on when a low level signal (hereinafter referred to as a "0" signal) is generated on an output terminal 5a of the con-trol circuit, while the generation of a high level signal (hereinafter referred to as a "1" signal) at the output terminal 5a causes the lamp 1 to turn off if it has already been turned on. Numeral 6 designates an inverter comprising a NAND circuit so that a signal produced at the output terminal 5a of the control circuit 5 is inverted and then applied to the base of a transistor 3 through a resistor 6a. Numerals 9 and 10 designate resistors connected in series between a ground-side end 1a of the lamp 1 and the ground; 11 a capacitor connected in parallel with the resistor 10 for preventing chattering; 12 a buffer transistor having its base connected to a junction point a of the resistors 9 and 10. Numerals 13 and 14 designate circuits which are identical with the circuit designated at 15 and enclosed by a two-dot chain line in FIG. 1. While the detailed constructions of the circuits 13 and 14 are not shown, the circuit 13 comprises a lamp 16 to be detected for example a left headlight of an automotive vehicle so that the lamp 16 is controlled to turn on and off according to the output signals from the control circuit 5 in the similar manner as the lamp 1 in the circuit 15. A lamp 17, for example one of the brake warning lamps of the automobile is also adapted to be detected, while the control circuit for controlling the turning on and off of the lamp 17 is not shown. Numerals 18, 19 and 20 designate exlusive NOR gates with one input terminal of the exlusive NOR gate 18 being connected to the output terminal 5a of the control circuit 5 and the other input terminal being connected to the collector of the transistor 12. The exclusive NOR gate 19 has its one input terminal connected to the output terminal 5a of the control circuit 5 and the other input terminal to the collector of the transistor in the circuit 13 which is equivalent to the transistor 12. The exclusive NOR gate 20 also has its one input terminal connected to the output terminal of the control circuit (not shown) for the lamp 17 of the circuit 14 and the other input terminal connected to the collector of the transistor in the circuit 14 which is equivalent to the transistor 12. Numeral 21 designates an OR gate for performing the OR operation on the outputs from the exclusive NOR gates 18, 19 and 20. The output terminal of the OR gate 21 is connected to the base of a transistor 8 through a resistor 22 and a failure indicating lamp 7 is provided as a collector load of the transistor 8. Numeral 23 designates a power supply storage battery.

With the construction described above, the operation of the system according to the present invention will now be explained. When the driver of an automobile acuates the control circuit 5 to turn on the lamps 1 and 16 which are headlamps so that a "0" signal is produced at its output terminal 5a, said "0" signal is inverted in the inverter 6 producing a "1" signal which is in turn applied to the base of the transistor 3 rendering it conductive and thus energizing the relay coil 2a of the relay 2 to close the normally open contacts 2b. When this occurs, current is supplied to the lamps 1 and 16 from the battery 23 through the normally open contacts 2b causing the lamps 1 and 16 to turn on. At this time, the transistor 12 is cut off producing a "1" signal at its collector. On the other hand, when the lamps 1 and 16 thus turned on are to be turned off or when they have previously been turned off, if a "1" signal is generated at the output terminal 5a of the control circuit 5, it is inverted in the inverter 6 and its inverted "0" signal is then applied to the base of the transistor 3 rendering it non-conductive. Consequently, the normally open contacts 2b of the relay 2 are opened so that if the lamps 1 and 16 are on, they are turned off, whereas if they have previously been turned off, they remain in the off-state. At this time, the transistor 12 is rendered conductive producing a "0" signal at its collector.

The following Table 1 shows the relationship between the signal generated at the output terminal 5a of the control circuit 5 and the signal generated at the collector of the transistor 12.

TABLE 1

| | Lamp 1 in normal condition | | Lamp 1 in failure condition | |
|---|---|---|---|---|
| Output terminal 5a of control circuit | "1" | "0" | "1" | "0" |
| Collector of transistor 12 | "0" | "1" | "1" | "1" |

It will be seen from Table 1 above that with the lamp 1 in normal condition, a "1" signal at the output terminal 5a of the control circuit 5 results in a "0" signal at the collector of the transistor 12, while a "0" signal at the former results in a "1" signal at the latter. On the other hand, if the lamp 1 is broken down, the operating circuit to the base of the transistor 12 is cut off completely so that with the base of the transistor 12 being grounded through the resistor 10, a "1" signal always appears at the collector of the transistor 12 irrespective of the presence or absence of the signal at the output terminal 5a of the control circuit 5. Consequently, the exclusive NOR gate 18 receiving as its inputs the signal produced at the output terminal 5a of the control circuit 5 and the signal produced at the collector of the transistor 12 produces a "0" output signal when the lamp 1 is in normal condition, while it produces a "1" signal when the lamp 1 is in the failure condition and there is a "1" signal at the output terminal 5a of the control circuit 5. On the other hand, if the lamps 16 and 17 in the circuits 13 and 14 have been broken down, a "1" signal appears at the output of the exclusive NOR gates 19 and 20, respectively, through the similar operation as with the circuit 15. Accordingly, if any one of the lamps 1, 16 and 17 is broken down, then the corresponding one of the exclusive NOR circuits 18, 19 and 20 produces a "1" signal so that the OR gate 21 receiving said "1" signal produces at its output a "1" signal which renders the transistor 8 conductive and thus causing the failure indicating lamp 7 to turn on, thereby giving a warning to the driver about the occurrence of the failure.

Now considering the failure detection of the lamps 1 and 16, it is necessary for failure detecting exclusive NOR gates 18 and 19 to receive at their one inputs a "1" signal from the control circuit 5. In other words, the "1" signal from the control circuit 5 means that the lamps 1 and 16 are to be turned off or they have already been turned off. Thus, in the described embodiment the failure detection is effected when the lamps 1 and 16 are off, that is, before the lamps 1 and 16 are turned on, and this makes the system of the present invention very useful.

Furthermore, even if the control circuit 5 produces a "1" signal for commanding the turning off of the lamps when the lamps 1, 16 and 17 are in normal condition, a small current insufficient to cause the lamps 1, 16 and 17 to go on is supplied to the lamps 1, 16 and 17 through the resistor 9, the base and emitter of the transistor 12 and the resistor 10, so that an excessive rush current which flows during the initial period of the current supply to the lamps 1, 16 and 17 can be suppressed thus preventing the occurrence of inconvenience due to this rush current, such as the destruction of the transistor 12.

In addition to the operations described above, irrespective of whether the lamp 1 has has been broken down or not, if the transistor 12 is broken resulting in conduction between the collector and emitter thereof or the lead connected to the transistor collector is grounded when there is a "0" signal at the output terminal 5a of the control circuit 5, a "1" signal is produced at the output of the exclusive NOR gate 18 causing the lamp 7 to turn on. This operation can equally take place in connection with the circuits 13 and 14. In other words, in the embodiment thus far described, in addition to the detection of failure in the lamps, the destruction of transistor 12 as well as the ground short-circuiting fault of the lead connected to the collector of the transistor 12 can also be detected.

Figure 2:
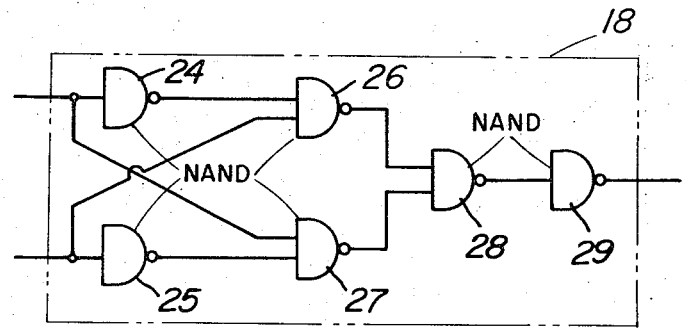
FIG. 2 is an electrical wiring diagram showing another embodiment of the exclusive NOR circuit used in the system of the present invention.

As will be seen from the previously mentioned Table 1, the exclusive NOR gates 18, 19 and 20 may be replaced with AND gates which are not specially designed to perform exclusive logical functions or logic circuits comprising in combination NAND gates and inverters. Moreover, instead of employing the exclusive NOR gates 18, 19 and 20, six NAND gates 24, 25, 26, 27, 28 and 29 may be employed to form, as shown in FIG. 2, an exclusive NOR circuit which performs the exclusive NOR logical function. Furthermore, a combination of an exclusive OR gate and an inverter may also be employed. Thus, it should be apparent that those and various other embodiments can be devised incorporating the subject matter of the present invention, that is, the logic circuitry which gives a warning when a predetermined condition is satisfied by the result of logical operation performed on the signal produced at one end on the grounded side of the lamp 1 (16, 17) which is levelshifted by a predetermined voltage with respect to the ground potential by the resistor 10 and the output signal of the control circuit which produces signals for controlling the lighting of the lamps. The warning means may also comprise, in addition to the lamp 7 employed in the illustrated embodiment, a semiconductor light emitting element such as a luminescent diode, a sound warning device such as a buzzer and so on.

Figure 4:
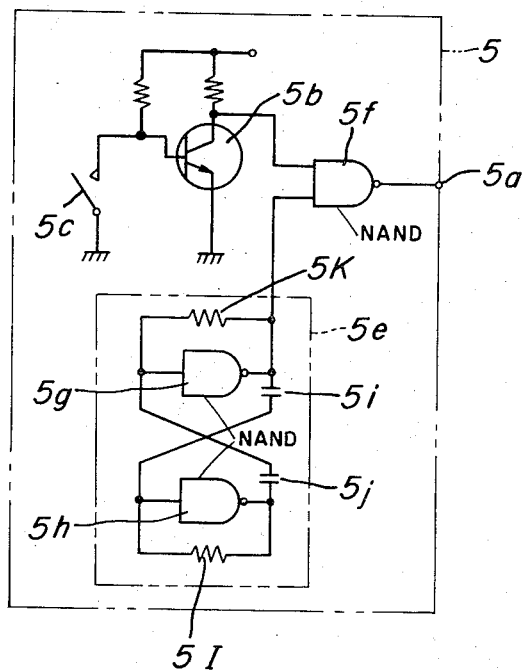

Still furthermore, by employing flashing lamps such as the direction indicator lamps on both sides of a vehicle as the lamps 1 and 16 shown in FIG. 1 and by constructing the control circuit 5 as shown in FIG. 4 for example, it is possible with the circuit construction shown in FIG. 1 to cause these lamps to flash by the output from the control circuit 5 and also to detect the presence of failure in the lamps. The construction and operation of the control circuit shown in FIG. 4 is as follows: When the lamp is required to flash, a switch 5c is closed rendering a transistor 5d non-conductive so that the output pulse from an astable multivibrator 5e is inverted in a NAND gate 5f thus producing the inverted output pulse at the output terminal 5a. To stop the lamp flashing, the switch 5c is opened rendering the transistor 5d conductive so that the output pulse from the astable multivibrator 5e no longer appears at the output terminal 5a and thus the "1" signal is continuously produced thereat. The astable multivibrator 5e comprises NAND gates 5g and 5h, capacitors 5i and 5j and resistors 5k and 5l.

I claim:

1. A lamp failure detecting circuit for use with at least one lamp and an electric source comprising:
   first means for detecting an electrical potential of the electric source through said lamp;
   second means for producing a first signal and including changeover switch means for selectively changing the potential level of said first signal between first and second levels;
   third means connected to said second means for selectively visibly actuating and visibly deactuating said lamp in response to said first signal when said first signal has the first and second potential levels respectively;
   logic circuit means having two input terminals connected to said first and second means for producing a second signal when said first means detects no presence of the electrical potential of said electric source and simultaneously said first signal has said second potential level; and
   fourth means connected to said logic circuit for indicating the failure of said lamp in response to said second signal.

2. A lamp failure detecting circuit according to claim 1, wherein one terminal of said lamp is connected to said electric source and the other to a grounded point through resistor means, said first means includes a transistor, the base, collector and emitter of said transistor being connected to the other terminal of said lamp, one of the two input terminals of said logic circuit and the grounded point respectively, and said third means includes a relay means adapted to be energized in response to said first signal having said first level and having a normally open contacts connected between the other terminal of said lamp and the grounded point.

3. A lamp failure detecting circuit according to claim 1, wherein said second means includes an astable multivibrator for generating an output signal of a periodic wave that alternatively changes from one to the other of two fixed values; and a logic circuit, connected to said changeover switch means and said astable multivibrator, for producing said first signal, said first signal being adapted to have said first level when said output signal of said astable multivibrator has said one value and to have said second level when said output signal of the same has said other value.

4. A lamp failure detecting circuit as in claim 1 wherein said logic circuit means provides an Exclusive Nor function for producing said second signal also when said first signal is at said first potential level at one of said input terminals and the other said terminal is at a level corresponding to said first potential level as opposed to said second potential level.

5. A lamp failure detecting circuit as in claim 1 wherein said third means is connected to said first means so as to route lamp current, when said lamp is visibly actuated as aforesaid, through said third means instead of said first means.

6. A lamp failure detecting system comprising:
   a power supply source,
   a lamp connected with said power supply source at one side thereof,
   level-shifting means connected between a reference potential and the other side of said lamp for level-shifting the said other side of said lamp by a predetermined potential with respect to the reference potential,
   level detecting means having an input terminal connected between the said other side of said lamp and said level-shifting means and an output terminal for generating an output signal indicating the level-shift condition of the other side of said lamp,
   control circuit means having a control terminal and an output terminal for generating an output signal when unactuated, said control terminal being connected between the said other side of said lamp and the input terminal of said level detecting means for turning on said lamp by decreasing the predetermined potential of the said other side of said lamp toward the reference potential when said control circuit means is actuated,
   sensing means having at least two input terminals and an output terminal, each of said input terminals being connected with the output terminals of said control circuit means and said level detecting means respectively for generating an output signal at the output terminal thereof when both input signals from said control circuit means and said control means are applied, and
   indicating means connected with the output terminal of said sensing means for indicating the failure of said lamp in response to the application of the output signal of said sensing means.

7. A lamp failure detecting system according to claim 6, wherein said control circuit means comprises:
   a control circuit for generating a signal to control the potential of the said other side of said lamp so that the lamp can be lit,
   switching means connected with said control circuit for generating an output signal in response to the signal of said control circuit, and relay means connected with said switching means, having a normally open contact for making contact in response to the output signal of said switching means to allow the control terminal to be at said reference potential.

8. A lamp failure detecting circuit according to claim 7 wherein said control circuit is an on-off switch.

9. A lamp failure detecting circuit according to claim 7 wherein said control circuit comprises:
an on-off switch,
an astable multi-vibrator for generating periodically an output signal of a predetermined duration, and
a logical operation means connected to be actuated by said on-off switch and connected to said astable multivibrator to be actuated by the periodical output signal, for generating said signal of the control circuit.

10. A lamp failure detecting circuit according to claim 6 wherein said level-shifting means is a resistor and said control means is a transistor.

* * * * *